3,511,769
ASPHALT SHEARING PROCESS
Luke W. Corbett, 382 Short Drive, Mountainside, N.J.
07092, and George A. Clarke, Jr., 910 Ripley Ave.,
Westfield, N.J. 07090
No Drawing. Continuation-in-part of application Ser. No.
740,492, June 27, 1968. This application May 15, 1969,
Ser. No. 825,026
Int. Cl. C10c 3/00, 3/04
U.S. Cl. 208—39     9 Claims

ABSTRACT OF THE DISCLOSURE

Industrial grade asphalts are produced by subjecting petroleum residua or asphalt fluxes to very high rates of shear in the presence of air and/or nitrogen oxides or inert atmosphere.

CROSS-REFERENCES TO RELATED APPLICATIONS

This application is a continuation-in-part of copending application, Ser. No. 740,492, filed June 27, 1968.

BACKGROUND OF THE INVENTION

Field of the invention

This invention relates to the preparation of improved asphaltic products. More particularly, the invention concerns a process for converting asphalt flux to high softening point products by subjecting a petroleum residuum or asphalt flux to intense forces of impact and hydraulic shear in the presence of air and/or nitrogen oxides or inert atmosphere. The shearing technique brings about a change in the physical and chemical characteristics of asphalt fluxes, thereby making them more suitable for roofing, saturating of fiber products, and a variety of sealing, caulking and waterproofing applications.

Description of the prior art

In conventional methods of refining petroleum, a large fraction is often obtained as the residue from distillation of petroleum crude oils. This fraction generally is referred to as the residuum, or as it has also come to be known, asphalt flux. This latter terminology indicates the principal effectiveness of this fraction as a starting material in the preparation of asphalt products. A number of techniques are known for producing asphalts of varying physical properties from asphalt flux. These include vacuum distillation, with or without the presence of steam, air blowing at elevated temperatures, and chemical treatment.

In general, the conventional asphalt conversion processes possess one or more inherent disadvantages. For example, the air-blowing of asphalt flux usually involves a batch operation which requires the use of bulky expensive equipment for long periods of time. Furthermore, the softening point-penetration relationship of air-blown asphalt frequently is not suitable for use in many possible applications. Similarly, steam or vacuum distilling of asphalt flux produces a relatively hard asphalt which is too temperature sensitive to be useful in many asphalt applications. The chemical treatment of asphalt flux may also be undesirable since it usually involves the use of expensive chemicals and/or the use of critical process control.

SUMMARY OF THE INVENTION

In accordance with the invention, it has now been found that improved asphaltic products are prepared by means of a process which comprises subjecting petroleum residuum or asphalt flux to high shearing forces for short periods of time at elevated temperatures in the presence of air and/or nitrogen oxides or inert atmosphere. As will be shown hereinafter, the intense shearing of the asphalt flux results in new and unexpected qualities which are not due merely to the increased contact of the asphalt with air or chemicals. Thus, although the mechanisms involved in the method of the invention are not fully understood, it is believed that the substantial improvements produced such as higher softening points for a given penetration level are due to the creation of reactive sites by scission of asphaltic material, which reactive sites enable these materials to combine in some manner to produce asphaltene-type components.

Suitable nitrogen oxides include, among others, nitric oxide (NO), nitrous oxide ($N_2O$), nitrogen dioxide ($NO_2$), nitrogen pentoxide ($N_2O_5$) and mixtures thereof. The preferred nitrogen oxide is nitrogen dioxide. Gaseous mixtures of air and nitrogen oxides in any relative proportions may also be used.

The petroleum residuum or asphalt flux utilized in the process of this invention may vary considerably depending upon the particular crude oil used, especially upon its geographic origin. Thus, some crude stocks will yield much larger proportions of residuum than others and there may be inherent variations in chemicals composition as well. The chemical identity of these residua however, is not important with respect to the success of the process of this invention, and it is unnecessary to become concerned about the differences in such chemical identities. These residua are conveniently defined in terms of softening point and flash point. As a practical matter, the residua are characterized by an ASTM softening point value of at least about 60° F., preferably within the range of from 75° F. to about 125° F., and a Cleveland Open Cup flash point above 400° F. Such limits define the range of commercially available straight run petroleum residua adapted for use in this process. Non-limiting examples of residua suitably employed are derived from Lagunillas, Tia Juana, Boscan, Aramco Talco, Kuwait, Oregon Basin, Lloydminister, Santa Maria, Kern River, Eucutta and Safanyia crudes, and the like.

As used herein, the term "shearing" is intended to include any method for subjecting the asphalt flux to shearing forces, that is, the application of force in a shearing plane. In a preferred embodiment, asphalt materials are forced to pass through a restricted opening where they are subjected to intense forces of impact and hydraulic shear. Examples of apparatus suitable for such purposes are: the Eppenbach homogenizer-mixer made and sold by Gifford-Wood, Inc., the Charlotte mill, the Gaulin homogenizers made and sold by the Manton Gaulin Manufacturing Company, the Morehouse mill made by Morehouse Industries, and other similar apparatus suitable for the purpose.

The amount of hydraulic shear or shearing stress to be applied to the petroleum residuum or asphalt flux will vary over a considerable range depending upon the initial softening point of the asphalt flux, and the time and/or temperature of application, etc., but it should be at least sufficient to effect an increase in the softening point of the asphalt flux, and preferably sufficient to increase the softening point of the asphalt flux at least 40%.

The rate of shear is preferably above 4000 reciprocal seconds, and still more preferably above 25,000 reciprocal seconds, e.g., 40,000–500,000 reciprocal seconds. In this connection, since the rate of shear is directly proportional to the diameter of the rotor operating within a stator and inversely proportional to the clearance between rotor and stator, the upper limit of shear rate is dependent upon practical sizing of the shearing apparatus. Conceiv it is possible to go to much higher rates of shear shearing forces) although the practical objectives his invention may be satisfied by shear rates herein ribed.

e shear stress may be applied by any suitable means mperatures which may be, for example, within the e between about 300° and 600° F., preferably 400° 550° F., for a period of time ranging from a few tes to several hours. Preferably, the high shearing will be applied for 10–100 minutes, more preferably 0 minutes.

DESCRIPTION OF THE PREFERRED EMBODIMENTS series of runs were made in which a Lagunillas ght reduced petroleum flux having a softening point )3° F. and a penetration of 182 at 77° F. was subd to various shearing rates in a conventional Eppenhomogenizer which is described in detail in "Wet ng and Homogenizing Equipment," pp. 12–14, Catalo. 600, issued by Gifford-Wood, Inc. (1957). Briefandard laboratory unit (model 1-L Homo-Mixer) used wherein mixing-homogenizing is carried on by rrsing a turbine-stator head in a mixing container. In tion, the turbine rotates at a speed that develops a ure differential between the bottom of the turbine the surface of the material being processed. As a , the product is continuously drawn from the botof the container and forced to pass through the reed openings in the mixing head where it is submito high shearing forces. In these experiments, a 1.5 radius rotor with 0.01 inch clearance were used.

e results set forth below were obtained by shearing ) ml. sample of the asphalt flux at elevated temperafor 1 hour in the presence of air, nitrogen dioxide trogen. The results obtained ar given below.

ERSION OF LAGNUNILLAS ASPHALT FLUX BY HIGH SHEARING RATES

| Shear r.p.m.[1] | Temp., °F. | Atmosphere | Final softening point, °F.[2] | Final penetration at 77° F.[3] |
|---|---|---|---|---|
| 500 | 360 | Air | 105 | 162 |
| 5,000 | 360 | N₂ | 118 | 79 |
| 5,000 | 360 | Air | 139 | 41 |
| 5,000 | 450 | N₂ | 172 | 21 |
| 5,000 | 450 | Air | 220 | 14 |
| 5,000 | 450 | NO₂ | 274 | 9 |
| 5,000 | 450 | Air [4] | 237 | 11 |
| 700 | 450 | Air [4] | 113 | 99 | rolutions per minute.
TM D-36-66T.
TM D-5-65
e air or NO₂ was passed through the asphalt flux at a rate of 1 liter nute (measured at 75° F. under 1 atmosphere pressure).
conventional stirred air-blowing process.

e 500 r.p.m. shear under the experimental conditions corresponds to a shear rate of a bout 8,000 reciproconds while the 5,000 r.p.m. is equivalent to about 0 reciprocal seconds. The relationship between r.p.m. eciprocal seconds was calculated from the formula:

$$R = \frac{2\pi r_m N}{h}$$

e $R$ = shear rate in sec.$^{-1}$ $r_m = \frac{r_1 + r_2}{2}$ = mean annulus radius adius of the rotor; $r_2$ = radius of stator; $N$ = revoluper second; $h$ = annulus width as estimated. (See M Special Technical Publication No. 299, covering symposium on Non-Newtonian Viscometry, October 1960, pp. 49–60, by F. J. Bonner and J. F. Gyer.)

As is seen from the above data, subjecting as asphalt flux to high shear rates results in an asphalt having a substantially higher softening point and lower penetration. A substantial improvement in softening point and penetration can be attributed merely to the use of high shearing rates. Thus, run A wherein the asphalt flux was exposed to an air blanket using low shearing rates resulted in only a small change in softening point and penetration. However, run B wherein the asphalt flux was exposed to a nitrogen blanket (i.e., no exposure to reactive gas) and a high shearing rate produced a product having a higher softening point and lower penetration value.

Runs C–H show that higher temperatures produce an even greater effect on softening point and penetration which effect is greatest when nitrogen dioxide is passed through the bulk asphalt flux. However, comparing run H with run B it is seen that the use of air-blowing, high temperatures and moderate shearing rates results in a lower conversion than is produced by a high shearing rate and a relatively low temperature without the presence of a reactive gas. In other words, vigorous shearing by itself produces an unexpected improvement in the qualities of asphalt.

What is claimed is:

1. method for the preparation of asphalts having improved softening point-penetration characteristics, which comprises subjecting a petroleum residuum to shearing at above 4000 reciprocal seconds of shear for a time sufficient to effect an increase in the softening point of the petroleum residuum.

2. A method according to claim 1 wherein said shearing is conducted at a temprature within the range between about 300° and 600° F.

3. A method according to claim 2 wherein said shearing force is above 25,000 reciprocal seconds.

4. A method according to claim 1, 2 or 3 wherein said residuum is sheared in the presence of air, nitrogen oxide or mixtures thereof.

5. A method according to claim 3 wherein said temperature is within the range between about 400° and 550° F.

6. A method according to claim 5 wherein said shearing force is applied for a time sufficient to increase the softening point of the petroleum residuum at least 40%.

7. A method according to claim 6 wherein said shearing force is within the range between about 40,000 and 500,000 reciprocal seconds.

8. A method according to claim 5, 6 or 7 wherein said residuum is sheared in the presence of air, nitrogen oxide or mixtures thereof.

9. A method according to claim 8 wherein said shearing force is applied for 15 to 30 minutes.

References Cited

UNITED STATES PATENTS

| | | | |
|---|---|---|---|
| 1,148,011 | 7/1915 | Davies et al. | 208—39 |
| 3,080,245 | 3/1963 | Barnett et al. | 208—39 |
| 3,235,482 | 2/1966 | Knowles et al. | 208—39 |
| 3,235,483 | 2/1966 | McCoy et al. | 208—39 |

DELBERT E. GANTZ, Primary Examiner

V. O'KEEFE, Assistant Examiner